Patented Nov. 5, 1935

2,020,189

UNITED STATES PATENT OFFICE 2,020,189

METHOD OF PRODUCING SOLID BODIES OF CARBON DIOXIDE AND THE PRODUCT

Charles L. Jones, Pelham, N. Y., assignor, by mesne assignments, to Adico Development Corporation, New York, N. Y., a corporation of New York No Drawing. Application January 3, 1934, Serial No. 705,133

21 Claims. (Cl. 252—5)

This invention relates to improvements in methods of producing blocks or solid bodies of carbon dioxide and the product of this method.

The general object of the invention is to modify the internal or physical structure of solid bodies of carbon dioxide to improve their structural characteristics and their aging behavior.

Experience with the production of solid carbon dioxide by any mechanical process has clearly demonstrated the wide variation in the physical characteristics of the product, particularly as it ages. This is true not only in comparing the product of one plant or process or set of manufacturing conditions with that of another, but it is equally true between different runs and parts of the same run of individual plants where every effort is being made to hold all manufacturing conditions uniform. The product produced under these different conditions enumerated above shows wide variations in its ability to withstand aging without loss of strength.

I have found this to be due to structural variations which in turn are the result of variations in the composition, amount, state, and aggregation of impurities or substances other than the carbon dioxide content.

My present invention is concerned with the control of these impurities or foreign substances, but with a view to producing a block of solid carbon dioxide having superior mechanical properties.

To more readily understand the nature of the invention I deem it advisable to consider the subject first from a theoretical viewpoint. By way of analogy, it is helpful to compare a block of solid carbon dioxide with a block of metal. In each case there is present a compact mass of crystals separated and yet bonded together by intercrystalline impurities. The impurities may form eutectics with the solid carbon dioxide, or they may not. They may enter into solid solution or chemical combination with the solid carbon dioxide, or not. In short, the structural characteristics of solid carbon dioxide are a function of the relationship and presence of impurities intermingled with the carbon dioxide crystals in the same sense as the relationship between the metal crystals and the impurities in a block of metal.

I have discovered that any impurity or foreign substance of such character that either alone or as a eutectic with carbon dioxide or with other impurities it possesses a lower melting point than the normal storage temperature of the solid carbon dioxide (approximately $-110°$ F.) will tend to promote more rapid growth of solid carbon dioxide crystals with the resultant tendency to make the product granular or "sandy". A granular or "sandy" block of solid carbon dioxide is regarded in the industry as commercially undesirable mainly because of the poor structural characteristics thereof.

Examples of impurities which promote the crystalline growth of solid carbon dioxide, even in traces, are methanol, ethanol, acetone, ethane, propane, butane, butylene, propylene, ethylene, acetylene, and indeed all chemical compounds having either alone or in mixtures a melting point very much below $-110°$ F. In the case of a mixture which has no definite melting point, which may be termed a low melting impurity, I have discovered that its fluidity at $-110°$ F. seems to exert the same influence since obviously a liquid of low viscosity forms a more favorable medium for crystal growth than a thick, viscous or plastic substance.

As opposed to the substances above enumerated including low melting point mixtures, I have found that certain other impurities tend to retard or control crystalline growth and hold in check the natural tendency of the product to become granular, "sandy", and weak structurally.

For the sake of clarity the word "impurity" has been employed in the above description since heretofore foreign substances of any kind in solid carbon dioxide were considered impurities, but it will be understood that I use the term to include all substances present other than carbon dioxide. The commonest of such so-called impurities is water and its presence in bodies of solid carbon dioxide has been the cause of many hitherto unexplained variations in the product, and particularly in the tendency of the product to become "sandy" on storage. I have found that these variations have frequently been due to accidental variations in the dispersion and content of water in solid carbon dioxide.

Before considering other possible impurities it is desirable to note some factors which determine the effect of water in specific cases. Water may exist in solid carbon dioxide either alone as water in the solid state, or as carbon dioxide hydrate. In the latter case time appears to be required for the hydration to take place. Since the carbon dioxide with water as an impurity is in normal manufacturing procedure maintained in the liquid state for short periods of time prior to solidification hydration of the carbon dioxide is only partial and the bulk of the water is present in uncombined form.

Water will further vary in its effect on the

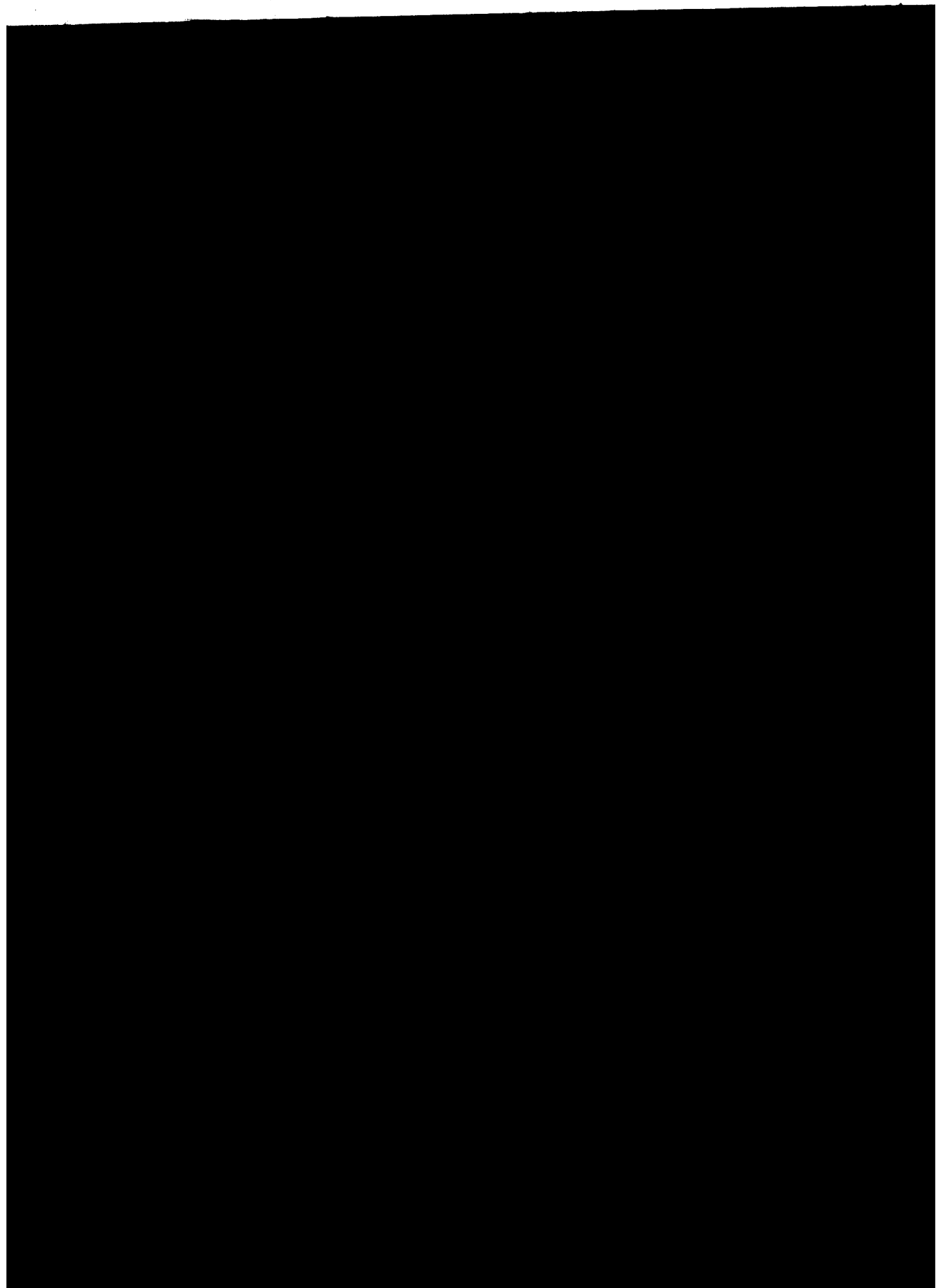

of impurities and further modified by the requirements of the finished product and the purposes for which it is intended.

In other words, while it is difficult to here set forth in detail where so many addition agents are available the specific quantities and proportions of each when used alone or in mixture with others, it is apparent to those skilled in the art that the limitations of this invention will be more readily apparent from a consideration of the effect of these addition agents upon the body of solid carbon dioxide. Where the addition agents are employed in the right proportions the body of solid carbon dioxide will have greatly improved structural characteristics and will be capable of compression into bodies of a density required in present commercial operation without the development of flaws and weaknesses. Furthermore the product in accordance with this invention is more stable physically and will withstand aging without structural deterioration.

It is of course apparent that in selecting these addition agents it is necessary to employ compounds or substances which have minimum odor or taste, and which are not poisonous, particularly in those cases where the solid carbon dioxide is to be employed in connection with food products. For some uses it is apparent that the range of addition agents may be larger where these limitations are not imposed.

In accordance with my invention it is desirable that the solid carbon dioxide be free of all impurities and contain nothing in addition thereto, except the addition agents as described above. In the event that impurities are present in the solid carbon dioxide it is desirable, in accordance with my invention, that none of them be a low melting impurity.

What I seek to secure by United States Letters Patent is:

1. A body of solid carbon dioxide containing a high melting addition agent and a medium melting addition agent, which agents improve the physical structure of the body.

2. A body of solid carbon dioxide containing water and ethylene glycol.

3. A body of solid carbon dioxide containing water and di-ethylene glycol-mono-ethyl-ether.

4. A body of solid carbon dioxide containing from 0.01 to 0.03% of an organic compound having a melting point between —110° F. and 32° F. and water and of such nature as to form a stronger body of carbon dioxide.

5. A body of solid carbon dioxide containing a predetermined quantity of a high melting addition agent and a predetermined quantity of a medium melting addition agent, said agents forming a structurally stronger body than would result from their omission.

6. A body of solid carbon dioxide substantially free from impurities melting below —110° F. and having a predetermined percentage of high melting impurity melting between 0° F. and 50° F. added, together with a predetermined percentage of plasticizer melting between —110° F. and 0° F., the high melting agent and the plasticizer causing a more coherent body.

7. A body of solid carbon dioxide containing a predetermined percentage of a plasticizer, which imparts increased strength to the body.

8. A body of solid carbon dioxide containing from 0.01 to 0.15% of water and 0.01 to 0.04% of di-ethylene glycol-mono-ethyl-ether, both by weight.

9. A body of solid carbon dioxide containing a small quantity of water and a predetermined amount of a compound having plastic properties at approximately —110° F. and improving the structural strength of the body.

10. A body of solid carbon dioxide substantially completely free of low melting impurities and having in mixture therewith a medium and a high melting addition agent, said agents producing and maintaining a stronger body structure.

11. A body of solid carbon dioxide containing a high melting addition agent and a plastic addition agent, said agent producing a structurally strong body.

12. A body of solid carbon dioxide containing di-ethylene glycol-mono-ethyl-ether.

13. A body of solid carbon dioxide containing glycerin.

14. A body of solid carbon dioxide containing ethylene glycol.

15. A body of solid carbon dioxide containing triethanolamine.

16. A body of solid carbon dioxide containing clean low cold test lubricating oil.

17. A body of solid carbon dioxide containing normal octane.

18. The method of improving the structural strength of solid carbon dioxide bodies which consists in adding a medium and a high melting addition agent to liquid carbon dioxide which increase the internal strength of the resulting body and then solidifying the liquid carbon dioxide.

19. The method of making strong, coherent solid carbon dioxide bodies which consists in adding a small quantity of water and a plasticizer, which improves the structural coherency of the body, to liquid carbon dioxide and solidifying the liquid carbon dioxide.

20. The method of manufacturing carbon dioxide which consists in adding water and di-ethylene glycol-mono-ethyl-ether to liquid carbon dioxide and solidifying the liquid carbon dioxide.

21. In the method of making solid carbon dioxide, the steps of removing all low melting impurities from liquid carbon dioxide, adding a medium melting and a high melting addition agent, which improves the structural characteristics of the resulting body, thereto, and solidifying the mixture.

CHARLES L. JONES.